T. G. FORTUNE & W. LOTRIDGE.
INDICATOR.
APPLICATION FILED JAN. 12, 1911.
1,063,963.
Patented June 10, 1913.
3 SHEETS—SHEET 3.
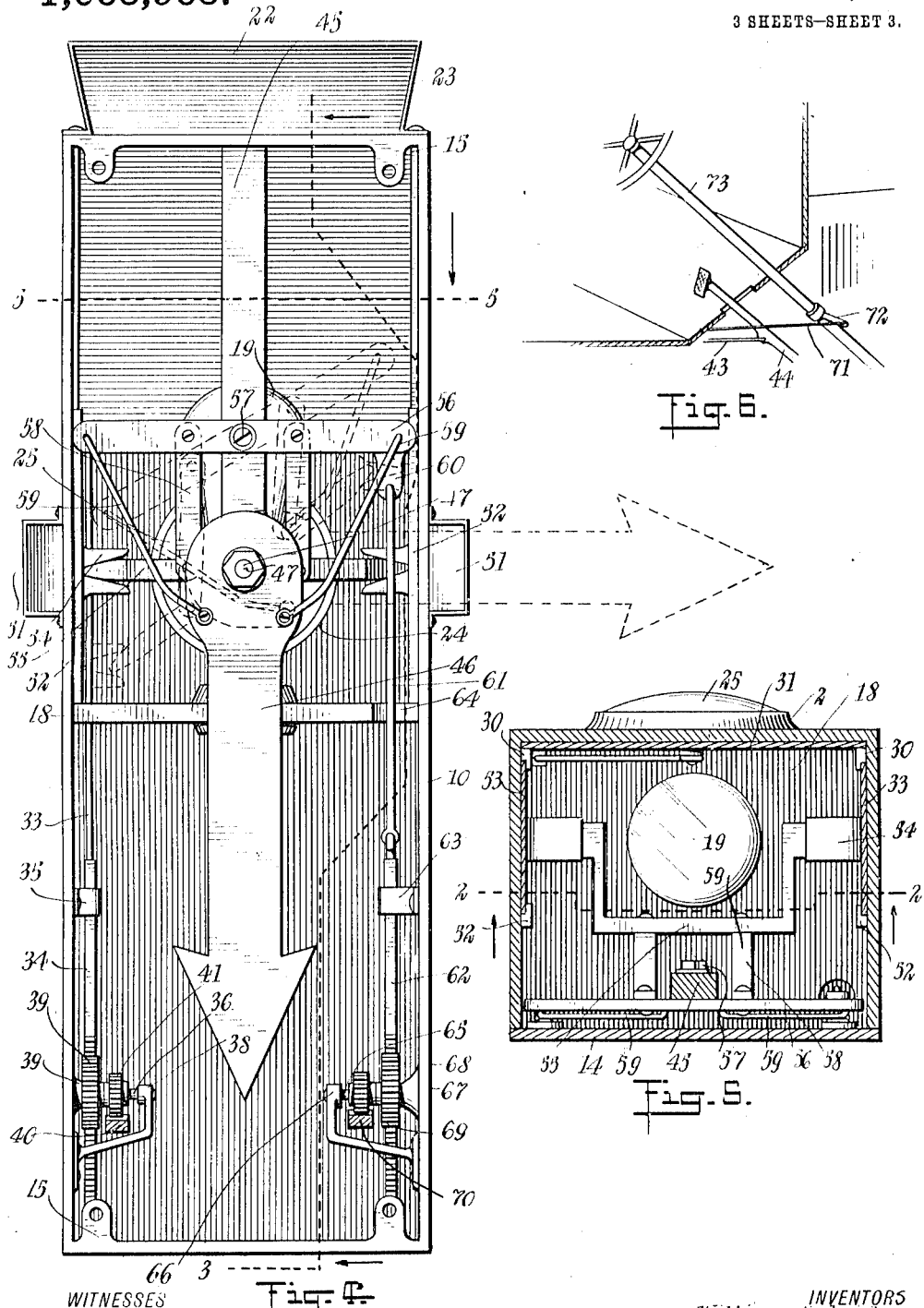
WITNESSES
INVENTORS
William Lotridge
Thomas G. Fortune
BY
ATTORNEYS

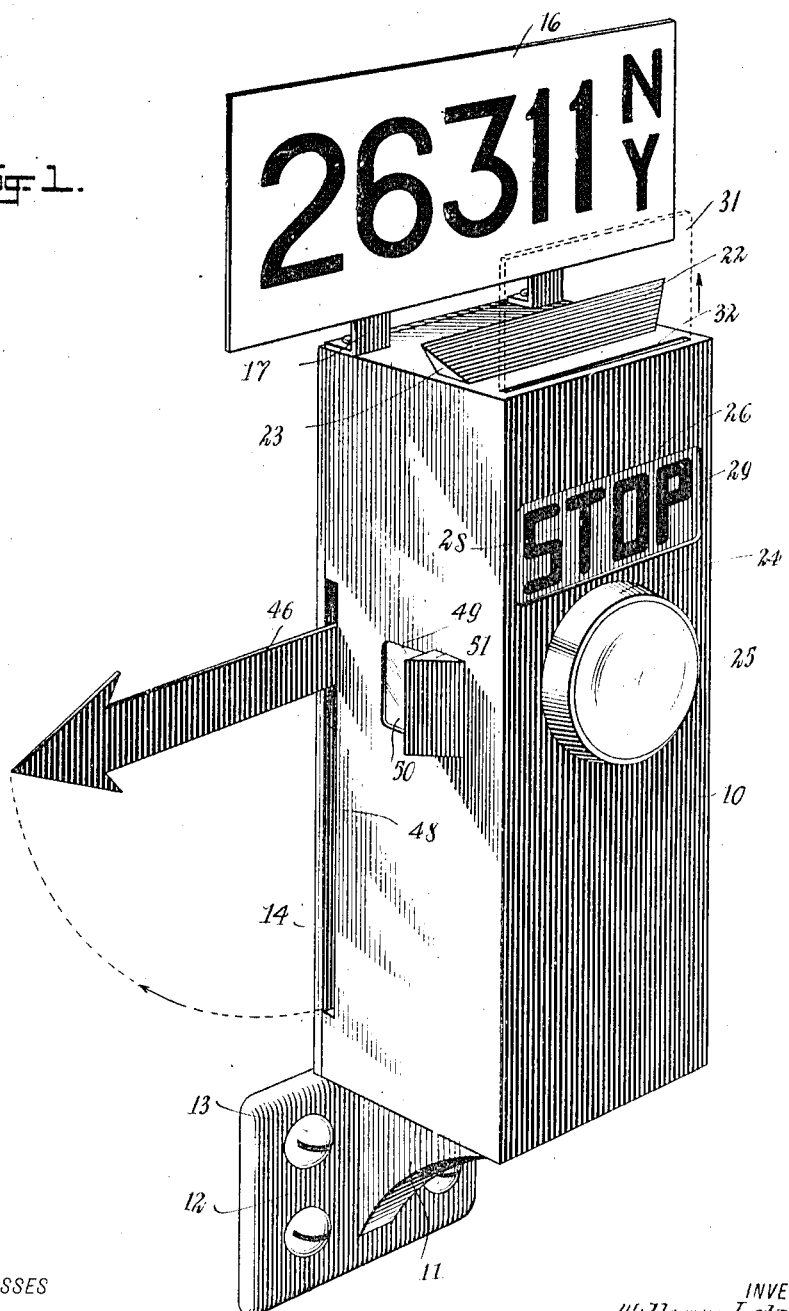

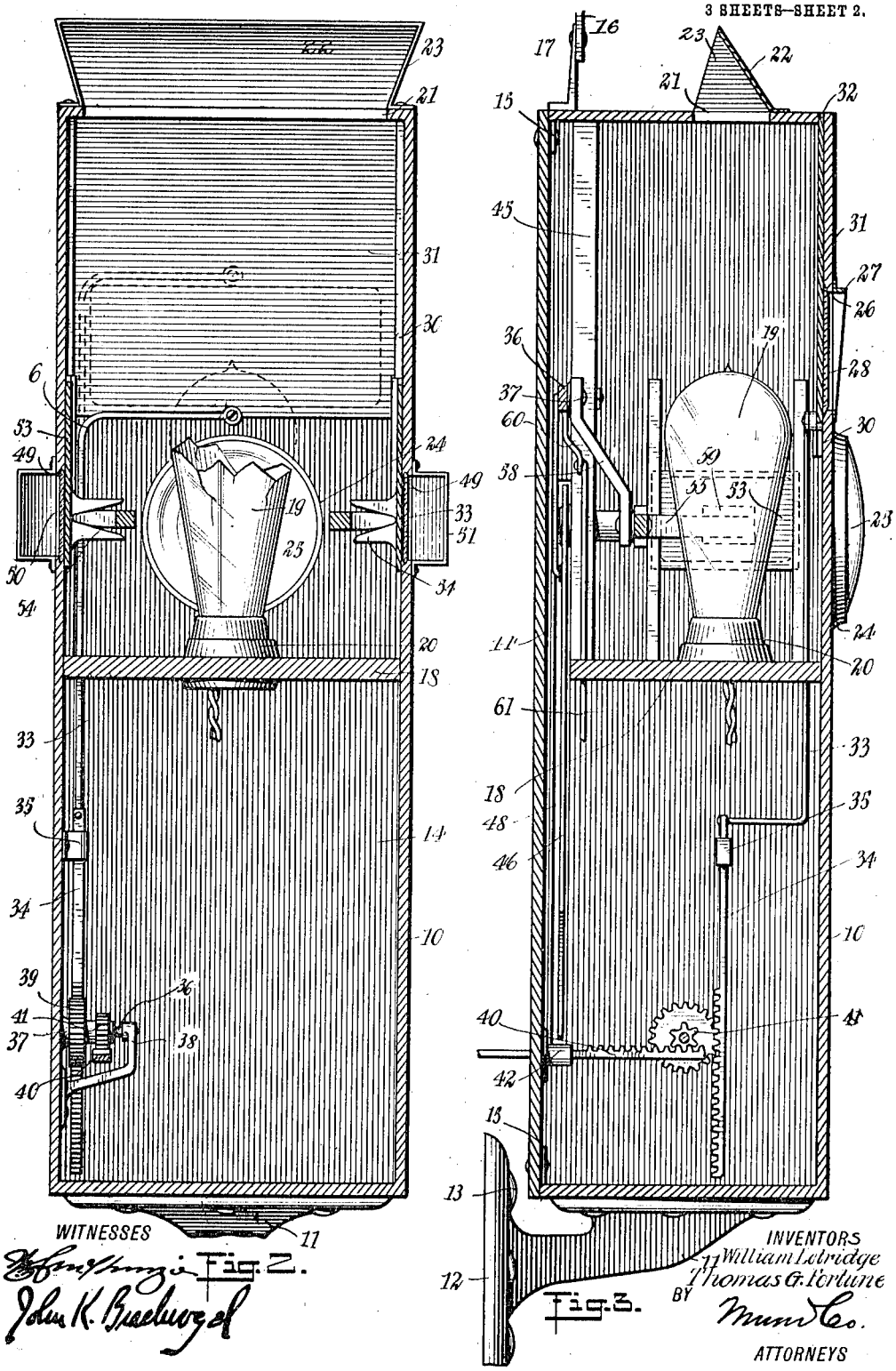

UNITED STATES PATENT OFFICE.

THOMAS GEORGE FORTUNE AND WILLIAM LOTRIDGE, OF NEW YORK, N. Y.

INDICATOR.

1,063,963.  Specification of Letters Patent.  Patented June 10, 1913.

Application filed January 12, 1911. Serial No. 602,147.

*To all whom it may concern:*

Be it known that we, THOMAS G. FORTUNE and WILLIAM LOTRIDGE, residents, respectively, of the borough of the Bronx and the borough of Manhattan, city of New York, in the county and State of New York, have invented a new and Improved Indicator, of which the following is a full, clear, and exact description.

This invention relates to indicators for use upon automobile vehicles and the like, and relates more particularly to a device of this class which comprises means for indicating in the daytime and at night the direction in which the vehicle is about to turn and the fact that it is about to come to a stop, and which also serves as a rear or tail light for the vehicle and as an illuminated license tag carrier.

The object of the invention is to provide a simple inexpensive and efficient indicator by which a number of different signals can be given, which is operable automatically in connection with the controlling apparatus of the vehicle—that is, with the steering device, the brakes, and the like, which can be easily mounted in place upon an automobile, or other vehicle, which is compact in form, comparatively light in weight, and attractive in appearance, and which can be used with equal success in the daytime and in the nighttime.

The invention consists in the construction and combination of parts, to be more fully described hereinafter and particularly set forth in the claims.

Reference is to be had to the accompanying drawings forming a part of this specification, in which similar characters of reference indicate corresponding parts in all the figures.

Figure 1 is a perspective view of an embodiment of our invention; Fig. 2 is a longitudinal section of the device, on the line 2—2 of Fig. 5; Fig. 3 is a similar view on the line 3—3 of Fig. 4, the section being taken at right angles to that shown in Fig. 2; Fig. 4 is a rear elevation of the indicator; Fig. 5 is a transverse section on the line 5—5 of Fig. 4; and Fig. 6 is a fragmentary perspective view, partially in cross section, indicating the operative connections between the indicator, the steering post and the foot brake of the vehicle.

Before proceeding to a more detailed explanation of our invention, it should be clearly understood that while the indicator can be advantageously employed in different ways for transmitting information through the operation of signal lights, a signal, semaphore arm, or the like it is particularly useful in connection with vehicles, such as automobiles or fire apparatus, wherein it serves to give warning to following vehicles of intended changes in the course, etc., of the vehicle bearing the indicator. Needless to say, the advantages incident to the use of an indicator of this kind are particularly great in city traffic, or wherever large numbers of vehicles are crowded together. It is often impossible to bring a following vehicle to a halt with sufficient rapidity to avoid running into a preceding one if the latter is, through some emergency, brought to a sudden stop or slows down in order to turn in one direction or the other. In an emergency of this kind our invention is particularly useful, in that it sets the signal automatically to indicate to the following vehicle what the preceding one is about to do. We have shown, for example, in the present form of the device, an arrow-shaped arm which swings to one side or the other to indicate a corresponding direction of turn, while a panel bearing the word "Stop" is used to indicate that the vehicle is about to come to a halt. The panel also exposes a transparent or translucent plate upon which the word "Stop" is also indicated and through which a light can shine to render the signal visible at night. The indicating arm, as will appear hereinafter, is illuminated when projected, so that it, too, is effective in the dark.

Certain of the details of the construction shown for example herein form no part of the invention, but can be varied in accordance with individual preference or special conditions, without departing from the spirit of our invention.

Referring more particularly to the drawings, we employ a casing 10 fashioned from sheet or cast metal, or any other suitable material, and of substantially rectangular and elongated form. On the lower portion the casing has rigid therewith a bracket 11 provided with a laterally extended plate 12 permitting the attachment of the indicator by means of screws 13, or in any other suitable manner, to the vehicle body. The casing is open at the rear and is provided with a closing plate or back 14 adapted to be attached removably, by means of screws or the like, to inwardly disposed edge lugs 15 of the casing. The casing serves as a carrier for a license tag or plate 16 which is mounted upon the top thereof by means of L-shaped lugs or brackets 17 screwed or otherwise secured in position. Within the casing and substantially central with respect thereto, is a partition 18 having the rear edge spaced from the back 14, for a purpose to appear hereinafter. A light 19 of any suitable form is carried by the partition. In the type of indicator illustrated for example herein, we have shown an incandescent electric light, but, needless to say, any other suitable illuminant can be employed. The light is mounted upon the partition by means of a convenient socket 20. On the upper part of the casing is an opening or slot 21 at the front of which is located an inclined reflecting hood 22 having sides 23. The hood serves to direct the light shining through the opening 21 onto the license tag to illuminate the same. The casing has at the wall thereof opposite the back 14 an opening at which is mounted an annular flange 24 carrying a lens or bull's-eye 25, preferably of red glass. The rays from the light 19 shine through the glass so that the indicator thus becomes effective as a rear or tail light for the vehicle. Above the bull's-eye 25 the casing wall has an elongated opening 26 surrounded by a frame 27 and having mounted therein a transparent or translucent plate 28—for example, a sheet of ground glass. Upon this plate are painted or otherwise indicated the letters 29 forming the word "Stop," so that when light shines through the plate the word will stand out prominently in the dark and be easily visible. At each side of the opening at the inside of the casing are undercut guides 30 between which is movably mounted a slide 31. This can be projected through a slot 32 in the top of the casing, so that when elevated it will show above the top. Upon this slide is also produced the word "Stop" so that when it is projected it will appear above the casing and can be easily seen. When in its depressed position the slide constitutes a shutter for the transparent signal and prevents the light from shining through it, so that this signal is then invisible in the dark. An operating member 33 is connected with the slide and has the lower end laterally disposed and operatively connected with a rack bar 34 movably mounted in a guide 35 secured within the casing to a wall thereof. A spindle 36 is journaled in bearings 37 and 38 of the casing and has a gear 39 in mesh with the rack teeth of the bar 34. A rack bar 40 has the teeth thereof in mesh with a pinion 41 rigid with the spindle 36, and extends movably through a sleeve 42 mounted in an opening in the back 14. The rack bar 40 is operatively connected by means of a link 43 with the foot brake 44 of the vehicle, as is shown in Fig. 6. Consequently, when the foot brake is operated, the gearing connecting the link 43 and the operating member 33 transmits the movement to the latter, which raises the slide 31 so that the stop signal thereby automatically becomes operative.

Within the casing is provided a post 45 near the back 14 and depending from the top of the casing. The post terminates preferably at the partition 18. A semaphore arm or signal indicator 46 is pivotally mounted by means of a screw 47, or the like, upon the post and is movable laterally between the back 14 and the partition 18 in both directions through cut-away parts or slots 48 of the casing sides, so that it can show at either side of the casing, as is indicated in Fig. 1. The casing walls adjacent to the slots 48 have openings 49, preferably provided with glass 50 and reflecting hoods 51 to direct the light shining through the opening onto the indicating arm or signal 46. Within the casing at the sides of the openings 49 are guides 52 in which are slidably mounted shutters 53 normally covering the openings to prevent the light from shining through. Each shutter has at the inner side a bifurcated projection 54 engaged by a tapered offset end of a pivoted lever 55 mounted upon the pivot pin or screw 47. An operating lever 56 is pivotally mounted by means of a screw 57, or the like, upon the post 45 above the member 46; it is operatively connected by means of offset pivoted links 58 with the lever 55. Pivoted links 59 likewise join the ends of the operating lever 56 and the member 46 at the opposite sides thereof near its fulcrum point, as is shown most clearly in Fig. 4. At one end the operating lever 56 has a downward extension 60 connected by means of an L-shaped link 61 with a rack bar 62 slidably mounted in a guide 63 near the lower end of the casing at the inside thereof. The partition has an opening 64 for the passage of the link 61. A spindle 65 is journaled in bearings 66 and 67 of the casing and has a gear 68 in mesh with the teeth of the rack bar 62. The spindle also carries a pinion 69 in mesh with the teeth of a rack bar 70 operatively connected by means of a link 71 with an arm 72 mounted upon the steering post of the vehicle. Consequently when the steering wheel is turned in one direction or the other, the link 71 transmits the movement to the gearing connecting it with the link 61 to move the operating lever 56 in one direction or the other. The signal arm 46 is correspondingly actuated and projects at one side or the other of the casing to indicate in which direction the vehicle is about to turn. The corresponding shutter—that is, the shutter at that side at which the signal arm projects—is moved from its opening 49 so that the light can shine through the latter upon the projected signal arm or semaphore.

Having thus described our invention, we claim as new and desire to secure by Letters Patent:

1. A device of the class described, comprising a casing, a movable signal arm within said casing and adapted to be projected at each side thereof, said signal arm being normally concealed within said casing, a light within said casing, said casing having openings through which said light can illumine said arm in either one of its projected positions, shutters normally closing said openings, means for operating said signal arm to project the same in either direction, and an operative connection between said last-mentioned means and said shutters.

2. A device of the class described, comprising a casing, a movable signal arm within said casing and adapted to be projected at each side thereof, said signal arm being normally concealed within said casing, a light within said casing, said casing having openings through which said light can illumine said signal arm in either one of its projected positions, shutters normally closing said openings, an operating member movably mounted within said casing, means for operatively connecting said shutters and said signal arm, and means for operatively connecting said operating member and a movable member of the controlling mechanism of a motor vehicle.

3. A device of the class described, comprising a casing, a signal arm pivoted within said casing and adapted to be projected at each side thereof, said signal arm being normally concealed within said casing, a light within said casing, said casing having openings through which said light can illumine said signal arm in either one of its projected positions, slidable shutters normally closing said openings, a pivoted operating member within said casing, links connecting said operating member and said signal arm, a lever operatively connected with said shutters, an operative connection between said lever and said operating member, and means for actuating said operating member.

In testimony whereof we have signed our names to this specification in the presence of two subscribing witnesses.

THOMAS GEORGE FORTUNE.
WILLIAM LOTRIDGE.

Witnesses:
JOHN J. NILAN,
W. S. CALDWELL.